(12) United States Patent
Renz et al.

(10) Patent No.: US 7,398,232 B2
(45) Date of Patent: Jul. 8, 2008

(54) INVENTORY EARLY WARNING AGENT IN A SUPPLY CHAIN MANAGEMENT SYSTEM

(75) Inventors: Alexander Renz, Heidelberg (DE); Ye Chen, Sunnyvale, CA (US)

(73) Assignee: SAP Aktiengesellschaft, Walldorf (DE)

( * ) Notice: Subject to any disclaimer, the term of this patent is extended or adjusted under 35 U.S.C. 154(b) by 405 days.

(21) Appl. No.: 10/208,180

(22) Filed: Jul. 31, 2002

(65) Prior Publication Data

US 2003/0225635 A1    Dec. 4, 2003

Related U.S. Application Data

(60) Provisional application No. 60/384,638, filed on May 31, 2002, provisional application No. 60/336,227, filed on Nov. 14, 2001.

(51) Int. Cl.
*G06Q 10/00* (2006.01)
(52) U.S. Cl. .......................................... 705/28; 705/10
(58) Field of Classification Search ................... 705/28, 705/29, 7–10, 22
See application file for complete search history.

(56) References Cited

U.S. PATENT DOCUMENTS

| | | | | |
|---|---|---|---|---|
| 4,688,026 | A * | 8/1987 | Scribner et al. | 235/385 |
| 5,168,445 | A * | 12/1992 | Kawashima et al. | 705/10 |
| 5,382,784 | A * | 1/1995 | Eberhardt | 235/462.46 |
| 5,548,110 | A * | 8/1996 | Storch et al. | 235/462.07 |
| 5,564,890 | A * | 10/1996 | Knudsen, Jr. | 414/802 |
| 5,582,497 | A * | 12/1996 | Noguchi | 414/281 |
| 5,595,356 | A * | 1/1997 | Kewin | 242/613.5 |
| 5,640,002 | A * | 6/1997 | Ruppert et al. | 235/462.46 |
| 5,819,232 | A * | 10/1998 | Shipman | 705/8 |
| 5,838,253 | A * | 11/1998 | Wurz et al. | 340/10.42 |
| 5,887,176 | A * | 3/1999 | Griffith et al. | 713/320 |
| 5,913,210 | A * | 6/1999 | Call | 707/4 |
| 5,953,234 | A * | 9/1999 | Singer et al. | 700/214 |
| 5,963,134 | A * | 10/1999 | Bowers et al. | 340/572.1 |
| 6,006,196 | A * | 12/1999 | Feigin et al. | 705/10 |
| 6,032,125 | A * | 2/2000 | Ando | 705/10 |
| 6,047,290 | A * | 4/2000 | Kennedy et al. | 707/103 R |
| 6,144,945 | A * | 11/2000 | Garg et al. | 705/28 |
| 6,182,070 | B1 * | 1/2001 | Megiddo et al. | 707/6 |
| 6,205,431 | B1 * | 3/2001 | Willemain et al. | 705/10 |
| 6,232,876 | B1 * | 5/2001 | Maloney | 340/568.1 |
| 6,243,613 | B1 * | 6/2001 | Desiraju et al. | 700/104 |
| 6,341,266 | B1 * | 1/2002 | Braun | 705/7 |

(Continued)

OTHER PUBLICATIONS

White, Ron, How Computers Work, Millennium Ed. Que Corporation, Sep. 1999.*

(Continued)

*Primary Examiner*—Vanel Frenel
(74) *Attorney, Agent, or Firm*—Blakely, Sokoloff, Taylor & Zafman, LLP

(57) ABSTRACT

An inventory agent operating on software includes instructions operable to cause a programmable processor to receive inventory data relating to stock in an inventory, apply the inventory data to a conditional probabilistic predictive statistical algorithm, calculate a predicted inventory level, and use the calculated predicted inventory level to determine whether to order additional stock for the inventory. The statistical algorithm uses a conditional probabilistic model to process the data. The inventory agent may be implemented in a supply chain management system.

39 Claims, 7 Drawing Sheets

U.S. PATENT DOCUMENTS

| | | | | |
|---|---|---|---|---|
| 6,341,271 | B1* | 1/2002 | Salvo et al. | 705/28 |
| 6,357,662 | B1* | 3/2002 | Helton et al. | 235/462.45 |
| 6,415,978 | B1* | 7/2002 | McAllister | 235/462.01 |
| 6,557,758 | B1* | 5/2003 | Monico | 235/380 |
| 6,611,726 | B1* | 8/2003 | Crosswhite | 700/99 |
| 6,693,539 | B2* | 2/2004 | Bowers et al. | 340/572.1 |
| 6,758,403 | B1* | 7/2004 | Keys et al. | 235/462.45 |
| 6,763,996 | B2* | 7/2004 | Rakers et al. | 235/375 |
| 6,834,266 | B2* | 12/2004 | Kumar et al. | 705/10 |
| 7,249,068 | B1* | 7/2007 | Kakouros et al. | 705/28 |
| 2002/0138336 | A1* | 9/2002 | Bakes et al. | 705/10 |
| 2002/0178127 | A1* | 11/2002 | Byde et al. | 705/80 |
| 2002/0188529 | A1* | 12/2002 | Krever | 705/28 |
| 2003/0093307 | A1* | 5/2003 | Renz et al. | 705/7 |
| 2003/0126103 | A1* | 7/2003 | Chen et al. | 706/50 |
| 2003/0225635 | A1* | 12/2003 | Renz et al. | 705/28 |
| 2004/0186794 | A1* | 9/2004 | Renz et al. | 705/28 |
| 2004/0215551 | A1* | 10/2004 | Eder | 705/38 |
| 2005/0075949 | A1* | 4/2005 | Uhrig et al. | 705/28 |

OTHER PUBLICATIONS

Derfler, Frank J. et al. How Networks Work, Millennium Ed., Que Corporation, Jan. 2000.*

Gralla, Preston, How the Internet Works, Millennium Ed., Que Corporation, Aug. 1999.*

Muller, Nathan J., Desktop Encyclopedia of the Internet, Artech House, Inc., 1998.*

Hirschey, Mark, and Pappas, James L.; Managerial Economics, 8th Ed., The Dryden Press, Fort Worth, TX, 1996.*

Sokol, Phyllis K., EDI, the Competative Edge, Multiscience Press, Inc., 1989.*

Poirier, Charles C., et al. E-Supply Chain, Using the Internet to Revolutionize Your Business, Berrett-Koehler Publisher, Inc, 2000.*

Horngren, Charles T., and Sundem, Gary L., Introduction to Financial Accounting, Revised 3rd Ed., Prentice-Hall, Inc., 1988.*

Borland's Paradox for Windows User's Guide, Borland International, Inc, 1994.*

Greene, James H, Editor-in-Chief, Production and Inventory Control Handbook, 3rd Ed., McGraw-Hill Companies, Inc., 1997.*

Riley, David D., Data Abstraction and Structure, An Introduction to Computer Science II, Boyd and Fraser Publishing Company, 1987.*

Spiegel, Murray R., Schaum's Outline of Theory and Problems of Statitics, 2nd Ed., McGraw-Hill, Inc., 1988.*

Fleming, Walter, and Varberg, Dale, Alegra and Trigonometry, 2nd Ed., Prentice-Hall, Inc., Englewood Cliffs, N.J., 1984.*

Agrawal, Narendra, and Stephen A. Smith, Estimating Negative Binomial Demand For Retail Inventory Management with Unobservable Lost Sales, Naval Research Logistics, vol. 33, pp. 839-861, John Wiley & Sones, Inc., 1996.*

Borland Report Smith for Windows, 1992, 1994 Borland International.*

Lapin, Lawrence, Statistics, Meaning and Method, 2nd Ed.., Harcourt Brace Jovanovich, Inc., 1980.*

Gavron, Jacquelyn, et. al., How to Use Microsoft Windows NT 4 Workstation, Macmillian Computer Publishing, USA, 1996.*

Greene, James H., Editor-in-Chief, Production and Inventory Control Handbook, 3rd Ed., The McGraw-Hill Companies, Inc., 1997.*

Dobler, Donald W. and Burt, David N., Purchasing and Supply Management, Text & Cases, 6th Ed., The McGraw-Hill Companies, Inc., 1996.*

Taylor, Bernard W., III, Introduction to Management Science, 5th Ed., Prentice-Hall INc., NJ, 1996.*

Brigham, Eugene F. & Gapenski, Louis C., Financial Management, Theroy & Practice, 7th Ed., The Dryden PRess, Harcourt Brace & Co., 1994.*

* cited by examiner

INVENTORY EARLY WARNING AGENT IN A SUPPLY CHAIN MANAGEMENT SYSTEM

RELATED APPLICATIONS

This application claims priority based on U.S. Provisional Application Ser. No. 60/336,227 filed Nov. 14, 2001, for SCM Supply Network Planning, and U.S. Provisional Application Ser. No. 60/384,638, filed May 31, 2002, for Inventory Early Warning Agent in a Supply Chain Management System, the disclosures of which applications are incorporated here by reference in their entirety.

TECHNICAL FIELD

This invention relates to agents, and more particularly to an inventory early warning agent used in a supply chain management system.

BACKGROUND

Today's companies need to adapt to many competitive pressures. For example, financial markets are increasingly demanding that companies use capital more efficiently; other businesses are seeking global playing fields to maintain growth and diversify risk; customers are demanding service as markets of one and forcing companies toward mass customization; and innovation cycles are continually accelerating.

These pressures on businesses are driving changes that have enormous implications for supply networks. For some companies, shrinking capital availability is forcing companies to streamline manufacturing and supply operations and build efficiencies, which are critical to the supply network. For other companies, information ubiquity is driving and facilitating globalization, which shrinks distances to markets and resources. The information ubiquity also requires levels of supply network visibility and collaboration that were not essential in traditional supply chains. Customers are armed with information about the real value of products, which is shrinking customer loyalty and requiring customer-service levels too expensive for companies that are unable to manage supply chain efficiencies. Finally, shrinkages in the time available to build and launch products are forcing companies to innovate at velocities far greater than before.

Ultimately, competitive pressures push profit margins lower. Product manufacturers must find ways to improve efficiency, thereby reducing costs, to survive in highly competitive markets. Supply chain efficiency plays a key role in improving margins and can be a determining factor in the success of manufacturers.

A supply chain is a network of facilities and distribution options that performs the functions of procuring materials, transforming the materials into semi-finished and finished products, and distributing the finished products to customers. Supply chain management ("SCM") is a business policy that aims to improve all activities along the supply chain. SCM results in improved integration and visibility within individual companies, as well as flexibility across supply and demand environments. As a result, a company's competitive position is greatly enhanced by building supply networks that are more responsive than the current sequential supply chains.

SAP AG and SAP America, Inc. provide SCM solutions for product manufacturers to help them reach their goals. Some of the SCM solutions are based on the mySAP.com e-business platform. One of the building blocks of the e-business platform is the SAP R/3 component that provides enterprise resource planning functionality. The SAP R/3 product includes a Web Application Server ("Web AS"), an R/3 core, and various R/3 extensions. The SCM Extensions of R/3 provide various planning, coordination, execution, and optimization solutions that are associated with a supply chain.

SUMMARY

In one general aspect, an inventory agent operating on software includes instructions operable to cause a programmable processor to receive inventory data relating to stock in an inventory, apply the inventory data to a conditional probabilistic predictive statistical algorithm, calculate a predicted inventory level, and use the calculated predicted inventory level to determine whether to order additional stock for the inventory. The statistical algorithm uses a conditional probabilistic model to process the data.

Embodiments of the inventory agent may include one or more of the following features. For example, the inventory data may be generated using a radio-frequency identification device and/or upon the sale of the stock in the inventory. The inventory data may be generated upon the transfer of the stock in the inventory.

The inventory agent may be implemented in a supply chain management system.

The conditional probabilistic model may use a conditional Gaussian approximation. The conditional probabilistic model may use historical inventory data and current inventory data. The conditional probabilistic model may further calculate an upside 10% confidence bound and a downside 10% confidence bound. The inventory agent may further include instructions to use the calculated upside 10% confidence bound and the downside 10% confidence bound in determining whether to order additional stock for the inventory.

The inventory data may further include actual cumulative replenishment, forecast cumulative replenishment, actual cumulative consumption, and forecast cumulative consumption data. The inventory agent may further include instructions operable to cause the agent to order a replenishment of the inventory.

The inventory agent may further include instructions operable to record data related to inventory consumption and replenishment. The inventory agent may still further include instructions operable to use the recorded data to calculate cumulative forecast consumption, cumulative forecast replenishment, cumulative actual consumption, and cumulative actual replenishment. The inventory agent may still further include instructions operable to use the inventory data with the calculated cumulative forecast consumption, cumulative forecast replenishment, cumulative actual consumption, and cumulative actual replenishment to calculate a second predicted inventory level.

In another general aspect a system includes one or more computer systems and an inventory agent computer coupled to the computer systems over a network. The inventory agent computer is operable to receive inventory data relating to stock in an inventory, apply the inventory data to a conditional probabilistic predictive statistical algorithm, calculate an expected inventory level, and use the calculated expected inventory level to determine whether to order additional stock for the inventory. The statistical algorithm uses a conditional probabilistic model to process the data.

The inventory agent computer may be implemented in a supply chain management system.

Embodiments of the system may include one or more of the following features. For example, the system may further include instructions to generate the inventory data upon receipt from a radio-frequency identification device and instructions to generate the inventory data upon the sale of the stock in the inventory. The system also may further include instructions to generate the inventory data upon the transfer of the stock in the inventory.

The conditional probabilistic model may use a conditional Gaussian approximation. The system may further include instructions to use historical inventory data and current inventory data in the conditional probabilistic model.

The system may further include instructions to further calculate an upside 10% confidence bound and a downside 10% confidence bound in the conditional probabilistic model. The system may still further include instructions to use the calculated upside 10% confidence bound and the downside 10% confidence bound in determining whether to order additional stock for the inventory.

The inventory data may include actual cumulative replenishment, forecast cumulative replenishment, actual cumulative consumption, and forecast cumulative consumption data. The system may further include instructions operable to cause the inventory agent computer to order a replenishment of the inventory.

The system may further include instructions operable to record data related to inventory consumption and replenishment. The system may still further include instructions operable to use the recorded data to calculate cumulative forecast consumption, cumulative forecast replenishment, cumulative actual consumption, and cumulative actual replenishment. The system may still further include instructions operable to use the inventory data with the calculated cumulative forecast consumption, cumulative forecast replenishment, cumulative actual consumption, and cumulative actual replenishment to calculate a second predicted inventory level.

The details of one or more embodiments of the invention are set forth in the accompanying drawings and the description below. Other features, objects, and advantages of the invention will be apparent from the description, the drawings, and the claims.

DESCRIPTION OF DRAWINGS

Like reference symbols in the various drawings indicate like elements.

DETAILED DESCRIPTION

Figure 1:
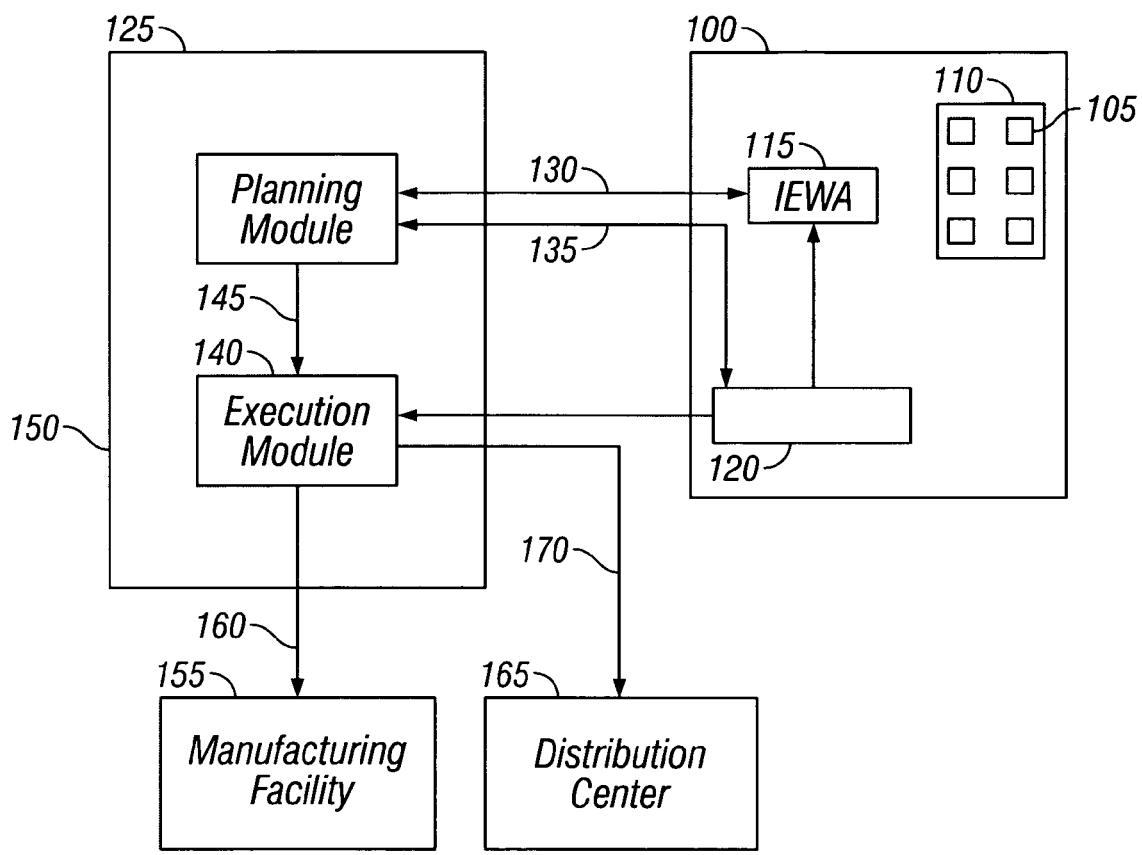
FIG. 1 is a plan view of an inventory early warning agent application to a shelf level monitoring system.

An agent is an active program that performs some high-level business functions, such as monitoring the inventory for a particular SKU for potential stock out situations and sending alerts when various thresholds are reached. For example, an agent can be programmed as an inventory early warning agent ("IEWA") that monitors one or more inventories in a factory, warehouse, store, or shelf within a store. The IEWA is programmed to monitor the inventory based on real time data that is obtained, for example, from cash registers or radio-frequency identification devices that scan information relating to an item being purchased or transferred and use that information to update the IEWA as to the level of stock on a particular shelf.

As described in more detail below, the IEWA is a predictive and adaptive inventory management application that can be used to monitor and predict future inventory levels by modeling variability in both demand and supply related supply chain activities. The IEWA uses learning techniques that can estimate potential variation in inventory levels in the near future in order to identify potentially risky situations early enough to allow for corrective measures. To provide increased effectiveness the IEWA is operated with minimal human intervention, parameter adjustment, and manual calibration. These characteristics are achieved with machine-learning techniques to recognize patterns of behavior from historical data around consumption and replenishment and around the performance of resources and supply chain partners. The IEWA can use two types of modes of operation for its predictive function: in a first mode use the IEWA predictive models built from detailed activities; and in a second mode use the IEWA predictive models built from the aggregation of multiple activities.

In the detailed mode of operation, potential variation in inventory is estimated for each planned replenishment or consumption activity. For example, given historical performance data, the IEWA estimates whether a planned truckload of 12 ounce bottles of Bob's bottles will arrive any time within four hours prior to and six hours after the planned delivery time with a quantity that is between 95% and 100% of the requested quantity. A second stage of processing then combines the estimates of potential variation for individual activities into an estimate of the potential variation of the projected inventory levels.

In the aggregate mode of operation, potential variation of the projected inventory level is estimated directly from projected cumulative replenishment and consumption. This estimate is calculated as the aggregation of replenishment and consumption activities.

Both modes of operation provide advantages. For example, the detailed mode of operation is advantageous when low volumes of detailed data are available and when the degree of variation in activities is highly dependent on the particular resource or partner involved. The aggregate mode of operation is advantageous when it is necessary to deal with high volumes of data, or when it is difficult to track the outcome of any particular planned activity. Although either mode of operation can be applied to the IEWA, only the aggregate model is discussed in detail below.

Referring to FIG. 1, a store 100 may want to have a minimum quantity of items 105 on a shelf 110 at any particular time such that the shelf can be stored with as large a variety of items as possible. For example, by limiting the quantity of a particular brand of tomato soup on a shelf at any particular time, a grocery store can display more brands of tomato soup on that shelf. To accomplish this type of shelving scenario, the store must carefully monitor the amount of stock on the shelf on a real time basis to prevent the shelf from emptying out. Currently, many stores use their employees to visually monitor empty space on the shelf and replenish the shelf when it looks empty. This is labor intensive and inexact. As illustrated in FIG. 1, the IEWA 115 receives shelf quantity data from a shelf-monitoring program 120 that, for example, monitors the quantity of a particular SKU number on the shelf. When an item 105 is scanned at the cash register, a database that contains the shelf location of the item is accessed and the program reduces the number of items on that shelf 110 by the number of items being purchased at that time. The IEWA 115 then uses algorithms to determine whether there is likely to be an undesirable variation in inventory and, if there will be one, when to send an order to replenish the shelf 110 with items of that particular SKU. When the quantity of items 105 on the shelf 110 reaches a certain level, the IEWA 115 sends a message to a planning module 125 along a first message path 130. The planning module 125 then sends return messages to the IEWA 115 along the first message path 130 and to the shelf-monitoring program 120 along a second message path 135. The shelf-monitoring program 120 then sends a return message to the planning module 125 along the second message path 135. The planning module 120 next sends a message to an execution module 140 along a message path 145. The planning module 125 and the execution module 140 may be components within a supply chain management application 150 or may be separate stand-alone components. After receiving the message from the planning module 125, the execution module 140 sends a first message to a manufacturing facility 155 along a message path 160 and a second message to a distributions center 165 along a message path 170. Based on this series of messages, the store is able to replenish its shelf with the item 105.

The IEWA 115 also can be used when the shelf is replenished. For example, when the shelf 105 is replenished, the shelf-monitoring program 120 sends a message to the execution module 140 along the message path 135, which sends a message to the distribution center 165 along the message path 170. These messages are used to update the distribution center of the amount of stock on the shelf 105. The distribution center can use the same IEWA or a separate IEWA to apply predictive models to the distribution center to estimate whether and when there will be an undesirable variation in inventory levels.

At another level, a store can use an IEWA to monitor the levels of an item on the shelf and in the inventory for one or more items to estimate potential undesirable variations in inventory levels. When items are sold, for example, by being scanned at a cash register, the IEWA takes that sales data and uses algorithms to determine whether there will be an undesirable variation in the inventory levels and when to send an order to replenish the shelf and/or order more of that item from a warehouse or distribution center.

At an even higher level, a warehouse or distribution center can use an IEWA to monitor the levels of an item within the warehouse, such as on shelves, on pallets, in quarantine, or at another location within the warehouse, to determine whether there will be an undesirable variation in the inventory levels and when to send an order to replenish. Customers of the warehouse, such as a retailer or a factory, order the item from the warehouse. For example, a consumer product goods ("CPG") retailer may order a pallet load of an item which the warehouse operator loads onto a delivery truck of either the warehouse, the retailer, or a third party logistics supplier. When the pallet is loaded on the truck, the warehouse operator may use a wireless communications device to notify the inventory management software that a pallet-load of a particular item has been transferred from the warehouse. Either the wireless communications device or the inventory management software may be programmed to notify the IEWA that a pallet-load of the particular item has been transferred from the warehouse. The IEWA takes that transfer data and analyzes it using algorithms to determine whether there is likely to be an undesirable variation in inventory levels and when to order addition stock of that item. One example of a framework of the IEWAs, an example of a messaging system used by the IEWAs, and the algorithms used by the IEWAs are described in more detail below.

Figure 2:
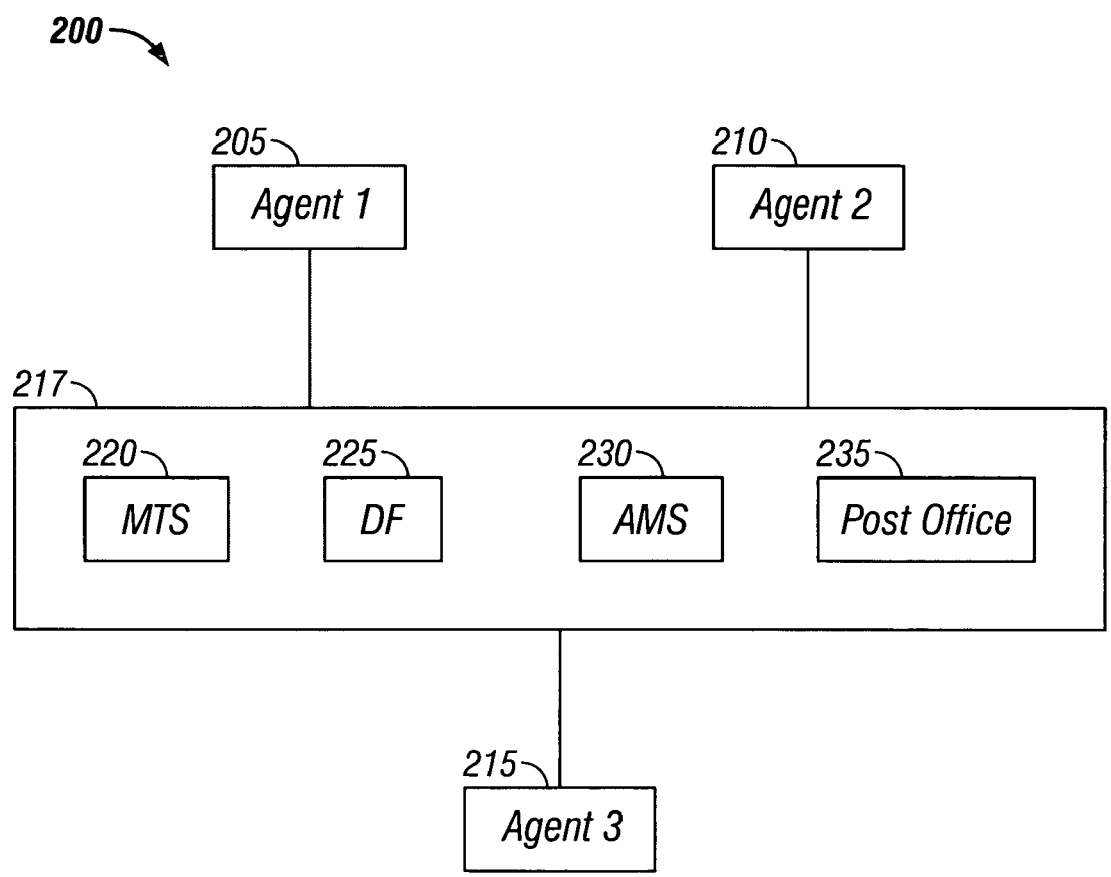
FIG. 2 is a plan view of an agent framework architecture that includes three agents.

Referring to FIG. 2, an agent framework architecture 200 includes three agents 205, 210, 215, each of which communicates with an agent framework 217 that provides frameworks services: a message transport service ("MTS") 220, a directory facilitator ("DF") 225, an agent management service 230 ("AMS"), and a Post Office 235. The agents 205, 210, 215 may be IEWAs. The agent framework refers to the container that provides programmatic support for agents. In this context, an agent framework can be implemented in Java code that runs in a single virtual machine on a particular host. Additional services are used to support the agents running inside the framework. These additional services include life cycle management, directory services, communication, configuration, logging, persistence, and notification.

The MTS 220 is a service that is provided by a particular agent framework and allows agents to send messages, such as an AclMessage, to other agents. An AclMessage encapsulates a communication between two agents and has some characteristics in common with an email message, such as, for example, specifying a sender and recipient, having a subject, and providing message content.

The DF 225 is a service provided by a particular agent framework and provides the framework's agents with access to the central directory service. The directory service is a central service that provides identity (white page) and capability (yellow page) search facilities across an agent community. There is one directory service for one agent community. A directory service might be federated with the directory service for another agent community. An agent community is a collection of agent frameworks (and therefore agents) that collaborate to provide various business functions. A community may consist of several agent frameworks, and each framework may in turn contain several agents.

The AMS 230 is a service provided by a particular agent framework and provides agent lifecycle management facilities within the framework. The facilities allow remote management of a community of agent frameworks by essentially providing an external interface to the AMS in each agent framework. For example, the AMS allows administrators and control agents to manage the execution of other agents by stopping, starting and suspending agents. The agent framework architecture 200 also includes an administrative user interface ("AUI") that allows a system administrator to manage an agent community. The AUI uses the directory service to identify currently running agent frameworks. It then uses each framework's AMS to manage the agents within that framework.

The post office 235 is a service provided by a particular agent framework. The post office 235 receives and maintains AclMessages addressed to the agents within that framework.

Figure 3:
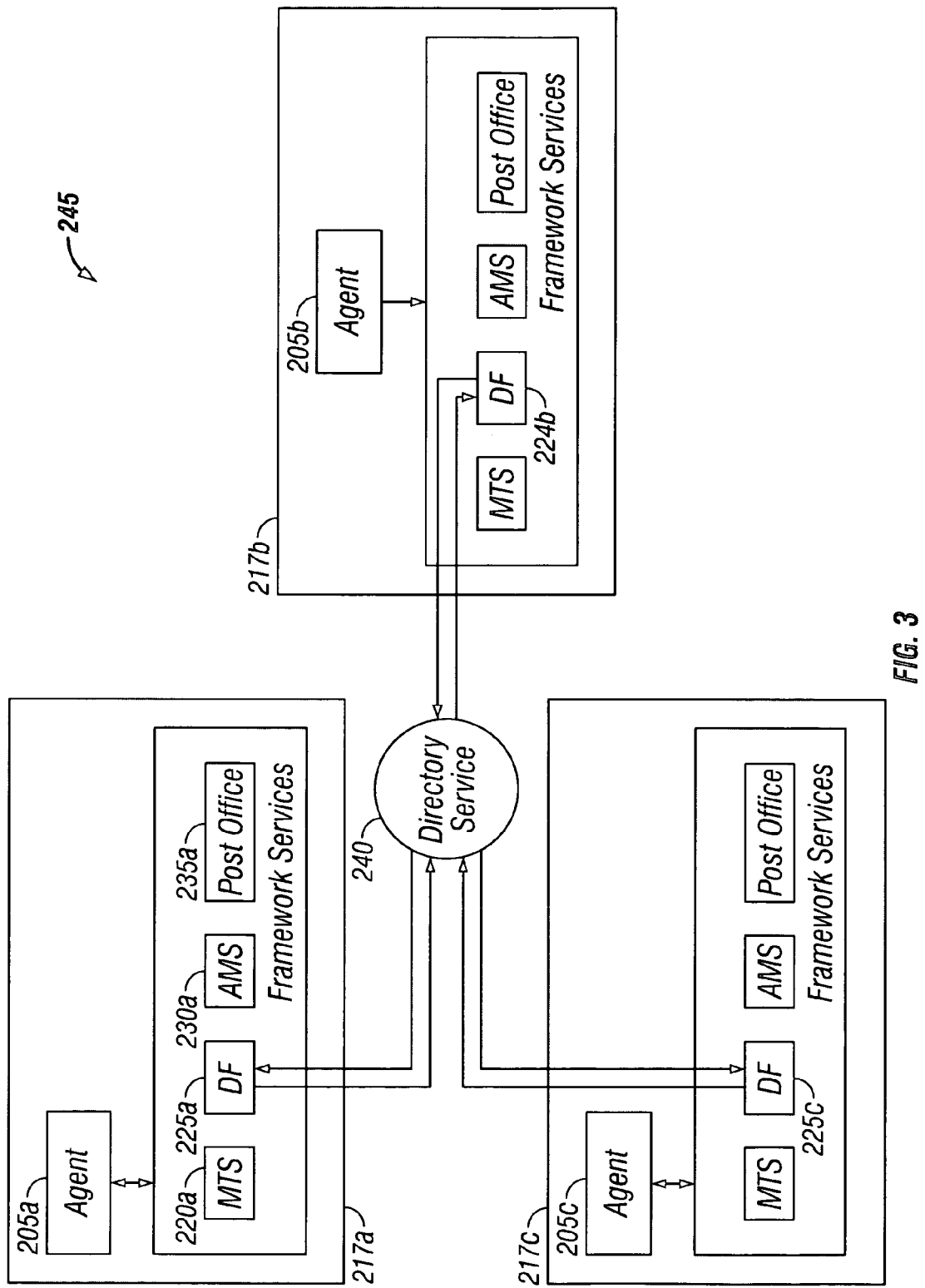
FIG. 3 is a plan view of a directory service of an agent community that includes three agent frameworks.

FIG. 3 illustrates the directory service 240 of an agent community 245 that includes three agent frameworks 217a, 217b, 217c, each of which runs on a separate host machine. The directory service 240 is a centralized service that is used to unify the agent community 245. The service can be implemented using the Java Naming and Directory Interface ("JDNI"). FIG. 3 shows only three agent frameworks 217a, 217b, 217c and, for simplicity, each agent framework contains only a single agent 205a, 205b, 205c, respectively. Nonetheless, the directory service can be implemented with more agent frameworks and each agent framework can include more agents.

The directory facilitator 225 ("DF") in each agent framework 217 updates the directory service 240, registering new agents as they are started up and deregistering agents as they are shut down. The directory service 240 then allows agents to search for other agents, both by identity (e.g., using a service that is analogous to a white page service) and capability (e.g., using a service that is analogous to a yellow page service). The DF 225 provides access to this functionality within each agent framework 217.

Figure 4:
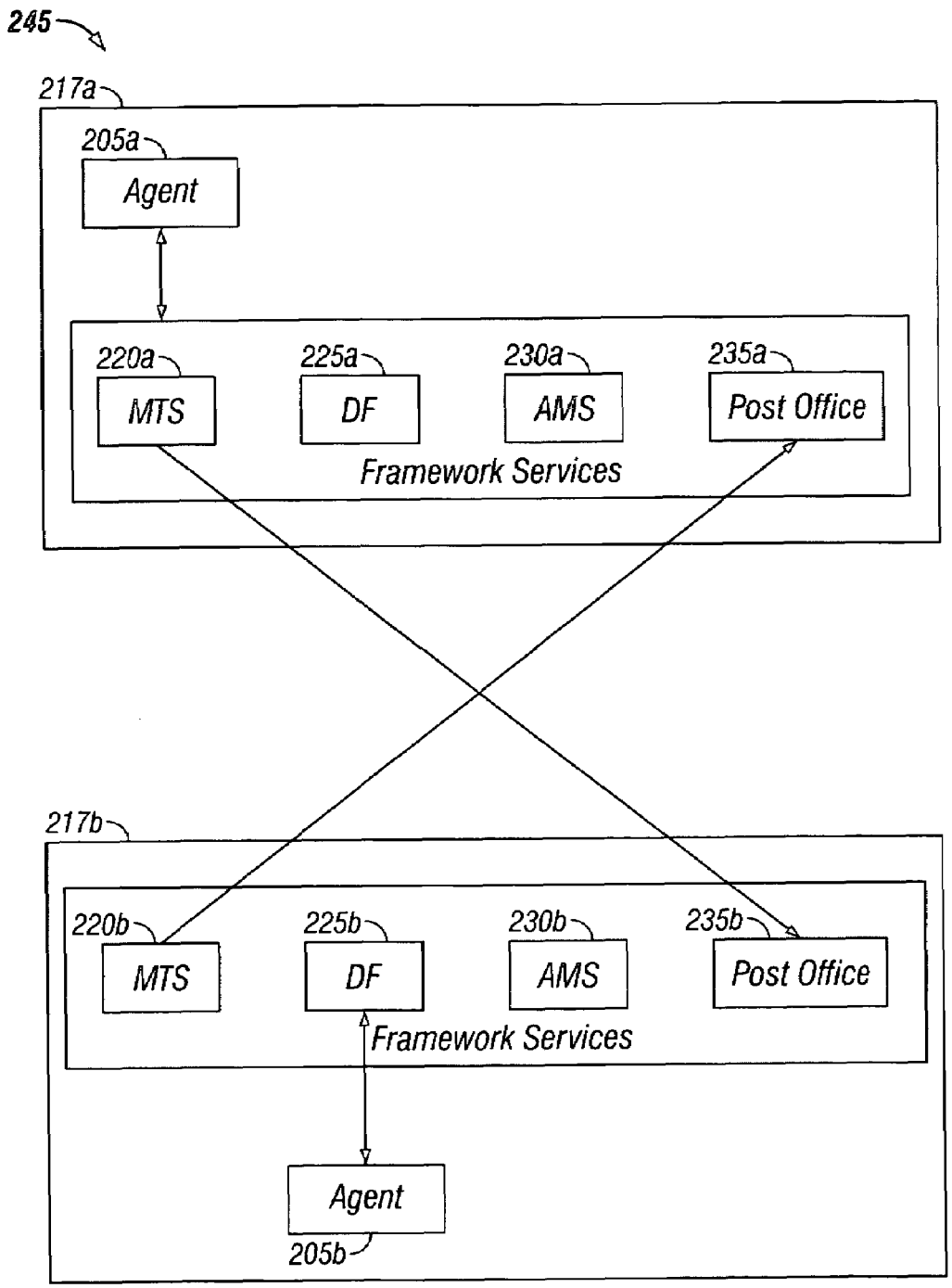
FIG. 4 is a plan view of the messaging architecture of the agent community of FIG. 3.

FIG. 4 illustrates the messaging architecture of the agent community 245. If the agent 205a requires the type of service provided by the agent 205b, it uses its DF function 225a to perform a capability directory lookup. The DF 225a informs the agent 205a that the agent 205b is capable of the type of service that it desires. The agent 205a then formulates an AclMessage and asks its local MTS 220a to deliver that message. The MTS 220a uses the DF 225a to locate the Post Office 235b for the agent 205b, and delivers the message to that Post Office 235b. The messaging architecture can be implemented using Java's Remote Method Invocation ("RMI") to deliver the message to the Post Office 235b. By providing flexibility in the design of the framework 217, the architecture can be implemented using other message transport mechanisms in the MTS, such as SOAP, JMS, CORBA, and JIMI.

Figure 5:
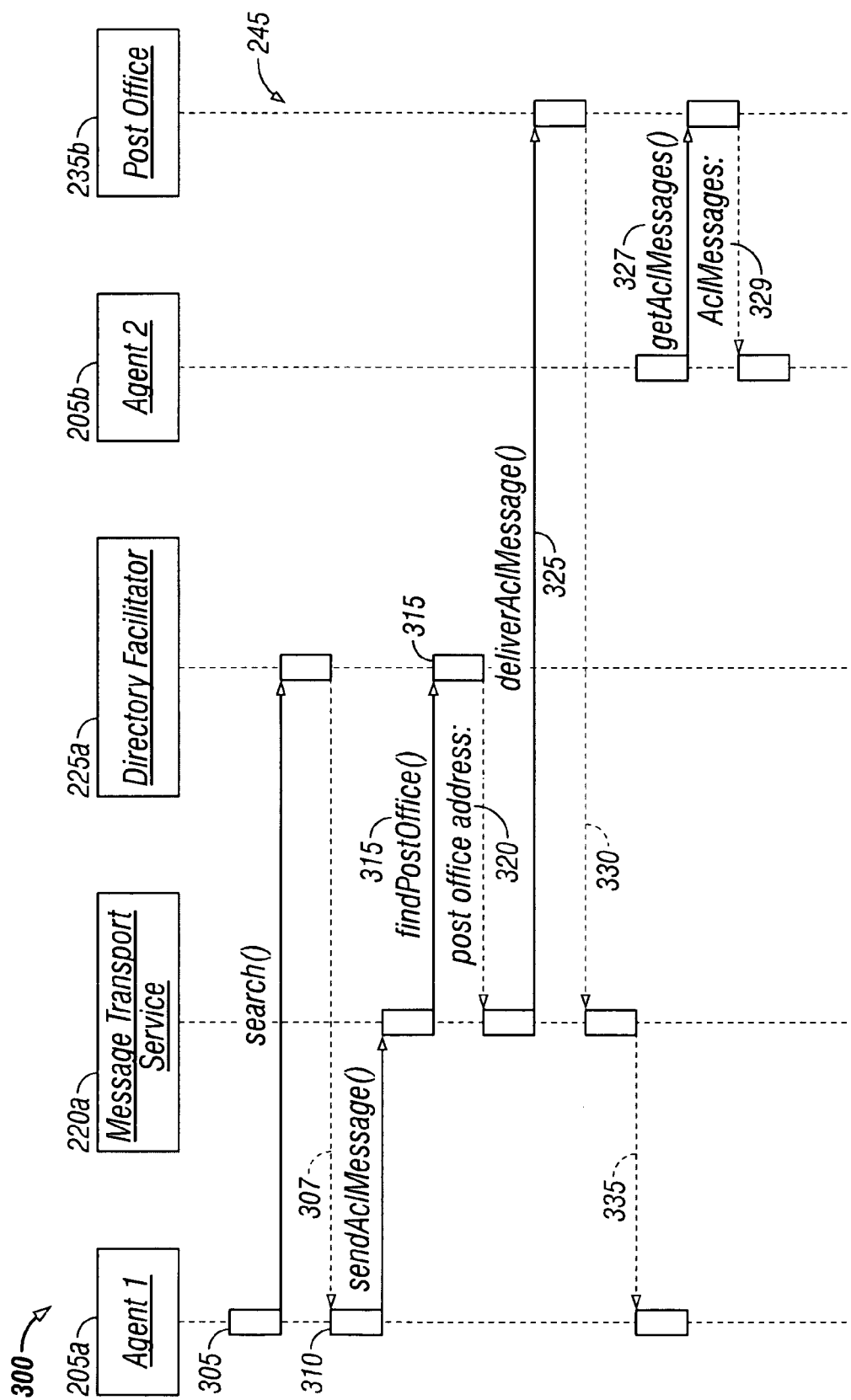
FIG. 5 is a plan view of a communication sequence between a pair of agents.

FIG. 5 illustrates a communication sequence for a typical communication scenario 300 that is indicative of the type of interactions that occur within the agent community 245. For example, the agent 205a can be implemented as an inventory early warning agent that is used to monitor the level of inventory on a shelf or within a store or a warehouse, process the inventory information, determine whether to replenish the inventory, and communicate a request to replenish the inventory. The agent 205a can receive inventory data from, for example, a computer system that receives sales data from a cash register scanning system. The agent 205a accumulates the sales data and processes the data continuously, periodically, or in a batch mode. As described in greater detail below, the agent 205a also must analyze the data and determine whether to request a replenishment of the inventory. The analysis can be as simple as a comparison of the amount of stock remaining to a threshold value or as complex as a statistical analysis of the likelihood that the stock will be emptied if the stock is not replenished within a set time. The scenario of FIG. 5 assumes that the agent 205a has determined that additional stock is required and will contact the agent 205b to deliver a replenishment request in a message. The agent 205b can be, for example, an agent used at a manufacturer or warehouse to communicate inventory levels to agents at stores that are served by the manufacturer or warehouse.

In the scenario of FIG. 5, the agent 205a wishes to send a message to agent 205b. The diagram shows the sequence of messages between participating objects to accomplish this scenario. First the agent 205a invokes a searchDirectory method 305, which is processed by the DF 205 and the result is returned to the agent 205a in a message 307. The agent 205a creates an AclMessage 310, retrieves the identification of agent 205b from the search result, sets the identification in the message's recipient field, and invokes a sendAclMessage 310. The sendAclMessage 310 is processed by the message transport service 220a ("MTS"), which communicates with the DF 225a in a findPostOffice communication 315 to find the Post Office address 320 for the agent 205b. The Post Office address 320 is communicated to the MTS 220a, which then delivers a message 325 to that Post Office 235b. The agent 205b queries the Post Office 235b in a query 327 and then uses a retrieval 329 to retrieve the message from the Post Office 235b for processing. The Post Office 235b also sends an acknowledgement communication 330 to the MTS 220a, which sends a communication 335 to the agent 205a. Like the agent 205a, the agent 205b can use an analytical method to determine whether to tell either the manufacturer to build more product or the warehouse to ship more product.

As described briefly above, the agents 205 may perform analysis of the inventory data that they receive to determine if there is likely to be a potential variation in inventory levels and, if so, when to request a replenishment of the inventory from a warehouse or the production of goods by a manufacturer to replenish the inventory in a warehouse or at a store. The analysis may be a simple process involving the comparison of inventory on the shelf or in a warehouse to a threshold value. If the inventory level is above the threshold value, the agent does not request replenishment but if the inventory level is at or below the threshold value the agent requests replenishment. Such an analysis does not take into account the likelihood that the stock on the shelf or in the warehouse will be sold quickly or slowly or that there may be some variability in the rate at which the stock is sold. Moreover, such an analysis does not take into account the likelihood that the warehouse or manufacturer will have sufficient stock on hand to supply the store, much less the likelihood that the warehouse or manufacturer can make a timely delivery. To ensure that the store, warehouse, or manufacturer has adequate quantities of stock to meet its needs while also minimizing excessive inventory levels, the agent 205 uses a conditional probabilistic predictive statistical analysis to predict an expected inventory level, an upside confidence bound, and a downside confidence bound. For many companies, an expected inventory level that is near or below zero is undesirable. The company can determine the minimum low level, compare the expected inventory level to the company's minimum low level, and order more stock if these expected levels are below the minimum low level.

Figure 6:
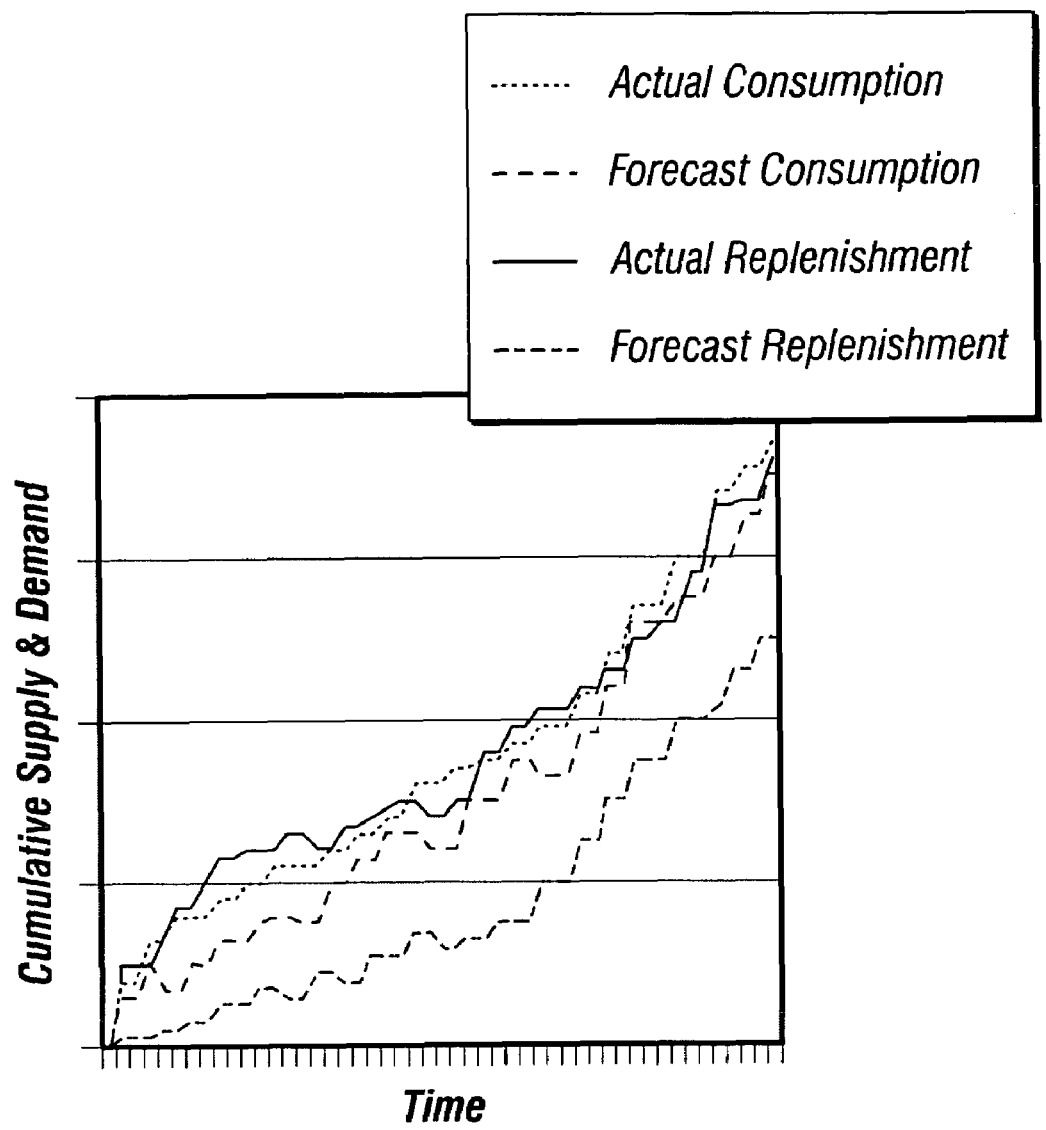
FIG. 6 is a graph illustrating cumulative inventory variables over time.

Referring to FIG. 6, the input data for the conditional probabilistic predictive statistical analysis is forecast cumulative consumption, forecast cumulative replenishment, actual cumulative consumption, and actual cumulative replenishment. FIG. 6 illustrates these values over time. In particular, the input data for the analysis includes a time advance, an actual cumulative replenishment, a forecast cumulative replenishment, an actual cumulative consumption, and a forecast cumulative consumption. The time advance variable is the setting describing how far in advance the prediction is intended. For example, a company concerned about its inventory levels for the next week would set the time advance to be seven days into the future. The actual cumulative replenishment variable describes the total amount of new material actually received into inventory up until the time advance is reached. The forecast cumulative replenishment describes the total amount of new material activities expected to be received into inventory up until the time advance is reached. The actual cumulative consumption describes the total amount of material actually withdrawn from inventory up until the time advance is reached. The forecast cumulative consumption describes the total amount of material expected to be withdrawn from inventory up until the time advance is reached. Of the predicted output values, the expected inventory level is the expected inventory level for the given time advance. The upside 10% confidence bound is the inventory value that the inventory level has a 10% chance of exceeding. The downside 10% confidence bound is the inventory value that the inventory level has a 10% chance of being below.

Any suitable statistical method can be used to determine the inventory level and confidence bounds. For example, the statistical analysis used by the agent 205 can be implemented with a predictive statistical model that can predict the variability at any point along the planned inventory trajectory, can be started with very little historical inventory data, and that improves as the data is generated over time. The plot of planned and actual inventory trajectories illustrated in FIG. 6 creates a number of records for training the predictive model: one for each time point in the plot. As such, such a dataset will only be complete when the data has been actually generated right up until the end of the plot.

One such statistical model that can be used is a probabilistic inference model based on a conditional Gaussian approximation. This model, its derivation, and its application to the inventory early warning agent are explained in more detail below.

To derive the model used for explanation purposes, there is an assumption of a known, planned forecast for inventory levels over time. The planned forecast is a piecewise constant function specified by its breakpoints. As illustrated in FIG. 6, the historical data is a record of planned and actual inventory levels over time. This data is generated as follows. Initially, at any given point in time, for example, day one, there is a forecast for consumption and replenishment for the next $\tau$ time periods and thus a forecast for the actual inventory levels out to time $\tau$. Along with this predicted consumption there is assumed to be a planned replenishment resulting in planned inventory levels out $\tau$ time periods into the future. The next day a new forecast is generated for consumption and replenishment out to time $\tau+1$ resulting in another planned inventory. Using this historical data, D, the model is based on determining the density P(I|D), where I is the vector of actual inventory levels at q predefined times $[I(t_1) K\ I(t_q)]^T$ in the future.

To actually develop a prediction algorithm, assume that inventory level plans are generated in regular fixed intervals, $\Delta$ (e.g., every day at midnight), and set the origin of time to be the time at which there is the earliest historical plan in the dataset. This origin of time may be recent and provide a very limited number of data points. Thus, plans are generated at times $n\Delta$ for $n \epsilon Z^+$, where n is the index of the most recent planning period. Further, assume that all plans are generated out to a horizon of $\tau(>\Delta)$ and indicate the inventory levels of plans generated at time $n\Delta$ by $I_n^P(n\Delta+\delta)$, where $0 \leq \delta \leq \tau$ is a continuous quantity. Because plans are generated at midnight, $\delta=0$ in the future. This inventory plan is piecewise constant and specified by its breakpoints $(I_n^P(b), \delta_n^P(b))$ for $\delta_n^P(b) \geq 0$ and $b \epsilon [1, K, B_n]$ where $B_n^P$ is the number of breakpoints defining the nth plan. For conciseness define $I_n^P(\bullet)$ and $\delta_n^P(\bullet)$ to be the $B_n^P$ vectors with components $[I_n^P(b) K\ I^{nP}(B_n^P)]^T$ and $[\delta_n^P(b) K\ \delta_n^P(B_n^P)]^T$. Furthermore, let $I^a(t)$ be the actual inventory at time t>0. The inventory is not measured at all times, but can be interpolated from a piecewise constant function. The breakpoints defining the actual inventory are given by $(I^a(b), t^a(b))$ for $b \epsilon [1, B^a]$ where $B^a$ is the number of breakpoints defining the actual inventory and all $t(b) \geq 0$. $I^a(\bullet)$ and $t^a(\bullet)\$$ are the $B^a$ vectors $[I^a(b) K\ I^a(B^a)]^T$ and $[t^a(b) K\ t^a(B^a)]^T$, respectively.

Based on the definitions above, for any time t there are a number of plans that predict the inventory at that time. For example, the most recent plan was formed at $\bar{s}=\lfloor t/\Delta \rfloor$ and the oldest plan was generated at $s=\lfloor (t-\tau)/\Delta \rfloor$ where s=quantity of stock ordered at the beginning of the period t. If $t=m\Delta+\delta$ with $0 \leq \delta \leq \tau$ the most recent plan was formed at $\bar{s}(m,\delta)=\lfloor m+\delta/\Delta \rfloor$ and the oldest plan was formed at $s(m,\delta)=\lfloor m-(\tau-\delta)/\Delta \rfloor$ where m=the model stock quantity, e.g., the company-specified desirable amount of stock on the shelf or in the warehouse. The number of plans forecasting any particular time is always $\lceil \tau/\Delta \rceil$ but the number of plans generated for time $m\Delta+\delta$ at or before $m\Delta$ is $s(\delta)=\lceil (\tau-\delta)/\Delta \rceil$.

Based on the above notation it is straightforward to develop or build the model and specify the data from which to build the model. Specifically, if n is the index of the most recent planning period, the times at which the model must predict the inventory levels are given by $t_\beta = n\Delta - \delta_\beta$. By defining the q vector $\delta \equiv [\delta_1, K, \delta_q]^T$, the model can be used to determine $P(I|n, \delta, I_2^P(\bullet 1), \delta_2^P(\bullet 1), I^a(\bullet), t^a(\bullet))$, where $I_2^P(\bullet 1)=[I_1^P(\bullet) L\ I^{nP}(\bullet)]^T$ and $\delta_{-2}^P(\bullet 1)=[\delta_1^P(\bullet) L\ \delta_N^P(\bullet)]^T$. To understand how the algorithm works it is helpful to understand how order streams are converted to the inventory levels that serve as the input to the aggregate predictor. Since the algorithm works entirely with inventory levels (whether planned or actual), consumption and replenishment order streams need to be converted into inventory levels. Conceptually, this is straightforward: replenishment orders increase the inventory while consumption orders decrease inventory. The only complication is that consumption and replenishment are only measured at certain times such that there is not data describing what happened to the inventory between those times at which the inventory was measured. Additionally, the times at which the measurements are taken may be irregularly spaced. Both of these problems are easily solved with a model of inventory levels between measurements.

The model of inventory levels is based on scenarios to which the inventory is actually subjected. As such, there are a variety of occurrences that might happen to the inventory levels between measurements. The simplest case is that the inventory was unchanging between measurements. This is termed the piecewise constant case since it is possible to interpolate inventory levels between measurements by using a piecewise constant function. Alternatively, if successive inventories are measured as $(I_1, t_1)$ and $(I_2, I_2)$ it is possible to linearly interpolate the inventory level at time t (where $t_1 \leq t \leq t_2$) as $I(t)=I_1+(I_2-I_1)(t-t_1)/(t_2-t_1)$. The model is based on the assumption of a piecewise constant rather than piecewise linear interpolation, although either choice or other interpolation mechanism is acceptable for data preparation since the algorithm is independent as to the choice. All the algorithm requires is that the inventory levels be measured at equally spaced intervals, $\Delta$, and this can always be accomplished by interpolation by either method.

The particular approach used with the IEWA uses the essential idea of exploiting correlations in errors between planned inventories and the actual inventories themselves. These correlations are used to estimate a probability density for a number of errors and then condition this density on the available data at the time a prediction needs to be made to find the likely errors at the time of prediction. The most likely correction to the planned inventory can then be applied to estimate the most likely actual inventory. The full probability can be used to define confidence intervals around this most likely prediction. Examples of correlations in errors include seasonal errors in inventory, such as season changes in inventory related to holidays or other seasonal events.

The estimation of the actual inventories uses an estimation of the systematic errors made in the planning process. Consequently, the model uses an error function defined so that $I^a(t)=I_n^P(t-n\Delta)+f_n(t-n\Delta)$ where $n\Delta$ is the time at which the plan was generated and which must satisfy $t-n\Delta \leq \tau$. For prediction into the future the model needs only an estimate of $f_n(t)$ since $I(n\Delta+\delta_\beta)=I^a(n\Delta+\delta_\beta)=I_m^P((n-m)\Delta+\delta_\beta)+f_m((n-m)\Delta+\delta_\beta)$ for all q choices of $\delta$. In the model, $f_n$ is defined as $f_n=[f_n(n\Delta+\delta_1) L\ f_n(n\Delta+\delta_q)]^T$, the vector of errors made by the nth plan as it forecasts the future. Knowing the probability density for $f_n$ is all that is needed since the density for $I_a$ simply shifts the mean.

The next step is to estimate $P(f_n)$ given the historical data by exploiting two types of correlations that likely exist in the data. First, the elements of $f_n$ are likely correlated because if inventory is high (or low) at time $n\Delta+\delta_1$ then it is also likely to be high (or low) at the later time $n\Delta+\delta_2$ so long as $\delta$ is not much greater than $\delta_1$. Moreover, it is reasonable to assume that the plans formed at subsequent planning periods will be correlated since the more recent plan is probably an update of an older plan. To capture such relationships in the historical data, the algorithm uses a model of the joint density $P(f_n, f_{n-1}, L, f_{n-p})$. A reasonable choice of p is $p=\tau$, although a good choice of p is that value determined by an autoregression algorithm. A suitable model for the joint density is that of a Gaussian joint density, as follows:

$$P(f_n^\%) = \frac{1}{\sqrt{(2\pi)^{(p+1)q} \det \Sigma^\%}} \exp\left[-\frac{1}{2}(f^\% - \mu^\%)^T \sum^{\%1}(f^\% - \mu^\%)\right] \quad (0.1)$$

where $f^\%$ is the vector of length $(p+1)q$ given by $$f^\% = [f_n^T f_{n-1}^T L f_{n-p}^T]^T.$$

As described in more detail below, this Gaussian model can be used for predicting inventory levels and calculating the mean and covariance.

If predicting forward from time $n\Delta$, $P(f_n)$ gives the distribution over the possibilities from which it is possible to infer expected values and confidence intervals. In general, this is obtained from $P(f_n^\%)$ by marginalizing over the previous errors $f_{n-1}, L, f_{n-p}$. However, the inventory situation is not this simple because it is desirable to condition the estimate on previously observed errors and not simply use a static estimate. In addition, many of the elements of the previous errors $f_{n-i}$ are for times greater than $n\Delta$ and consequently are unknown for the purposes of prediction. The unknown elements from $f_{n-i}$ are those for which $(n-i)\Delta+\delta_\Delta > n\Delta$ or more simply those for which $\delta_\alpha > i\Delta$.

As a solution, define $$f_{n-i} = [(f_{n-i}^\leq)^T (f_{n-i}^>)^T]^T \text{ where, } f_{n-i}^\leq = \{f_{n-i} | \delta_\alpha \leq i\Delta\}$$

and $$f_{n-i}^> = \{f_{n-i} | \delta_\alpha > i\Delta\}.$$

The density that then must be determined from $P(f_n^\%)$ is $$P(f_n | f_{n-1}^\leq, L, f_{n-p}^\leq),$$

which is easily determined by integration and an application of Bayes rule.

The first step is integrating to determine $$P(f_n | f_{n-1}^\leq, L, f_{n-p}^\leq),$$

as illustrated below:

$$P(f_n | f_{n-1}^\leq, L, f_{n-p}^\leq) = \int df_{n-1}^> L d f_{n-p}^> P(f_n, f_{n-1}^\leq, f_{n-1}^> L, f_{n-p}^\leq, f_{n-p}^>) \quad (0.2)$$

where $$P(f_n, f_{n-1}^\leq, f_{n-1}^> L, f_{n-p}^\leq, f_{n-p}^>)$$

is given by Eq. (0.1). The integration results in another Gaussian distribution with mean $\mu^\leq$ and covariance $\Sigma^\leq$. If $N^>$ is a subset of $\{1,2,L,(p+1)q\}$ giving the indices in $$f_n^\% \text{ of } f_{n-1}^>, L, f_{n-p}^>$$

and $N^\leq = \{1,2,L,(p+1)q\} \setminus N^>$ then $$\mu^\leq = \mu^\%(N^\leq) \text{ and } \Sigma^\leq = \Sigma^\%(N^\leq, N^\leq). \quad (0.3)$$

The notation $a(N_r)$ indicates the $|N_r|$-vector formed from a by keeping the elements in the ordered index set $N_r$. The elements are ordered according to the order in N.

Similarly $A(N_r, N_c)$ is the $|N_r| \times |N_c|$ matrix formed from A by keeping the rows in $N_r$ and the columns in $N_c$ in their respective orders. This description uses the common notation that $|S|$ gives the number of elements in the set or vector S.

Applying Bayes rule results in $$P\left(f_n | f_{n-1}^\leq, L, f_{n-p}^\leq\right) = P(f_n, f_{n-1}^\leq, L, f_{n-p}^\leq) \bigg/ \int P(f_n, f_{n-1}^\leq, L, f_{n-p}^\leq) df_n.$$

A standard calculation yields this conditional probability as Gaussian having mean and covariance given by $$\mu(f_n^{\%\leq}) = \mu_1 + \sum_{1,2} \sum_{2}^{-1} (f_n^{\%\leq} - \mu_2) \text{ and} \quad (0.4)$$

$$\Sigma(f_n^{\%\leq}) = \sum_{1} - \sum_{1,2} \sum_{2}^{-1} \sum_{2,1}$$

where $$f_n^{\%\leq} = [(f_{n-1}^\leq)^T L (f_{n-p}^\leq)^T]^T.$$

The above formula assumes that $\Sigma_2$ is invertible. In many situations this may not be the case (e.g., if the planned and actual activities are always in complete agreement). As such, Eq. (0.4) is modified to be:

$$\mu(f_n^{\%\leq})=\mu_1+\Sigma_{1,2}(\Sigma_2+\lambda I)^{-1}(f_n^{\%\leq}-\mu_2) \text{ and } \Sigma(f_n^{\%\leq})=\Sigma_1-\Sigma_{1,2}(\Sigma_2+\lambda I)^{-1}\Sigma_{2,1} \quad (0.5)$$

where I is the identity matrix having the same size as $\Sigma_2$ and $\lambda$ is a small positive quantity (e.g., $10^{-5}$). In Eq. (0.5) the $\mu$ vectors are given by $$\mu_1=\mu^{\leq}(N_1), \mu_2=\mu^{\leq}(N_2) \quad (0.6)$$

and the $\Sigma$ matrices are defined by $$\Sigma_1=\Sigma^{\leq}(N_1,N_1), \Sigma_{1,2}=\Sigma^{\leq}(N_1,N_2), \Sigma_{2,1}=\Sigma^{\leq}(N_2,N_1), \text{ and } \Sigma_2=\Sigma^{\leq}(N_2,N_2) \quad (0.7)$$

where the index sets are $N_1=\{1,2,L,q\}$ and $N_2=\{q+1,q+2,L, |f_n^{\%\leq}|+q\}$.

Using the above results, the complete algorithm can be used to make the prediction as follows: (1) assuming a value of p (or having the algorithm determine p), construct an estimate of $\mu^{\%}$ and $\Sigma^{\%}$ from the historical data; (2) construct the index set $N^{\leq}$ and form $\mu^{\leq}$ and $\Sigma^{\leq}$ from $\mu^{\%}$ and $\Sigma^{\%}$ according to Eq. (0.3); (3) using historical error values construct the vectors of past errors $$f_{n-1}^{\leq}, L, f_{n-p}^{\leq};$$

(4) build $\mu(f_n^{\%\leq})$ and $\Sigma(f_n^{\%\leq})$ according to Eqs. (0.5), (0.6) and (0.7); and (5) return $[I^p(n\Delta+\delta_1)L\ I^p(n\Delta+\delta_q)]^T+\mu(f_n^{\%\leq})$ as the predicted actual inventory levels and return $\Sigma(f_n^{\%\leq})$ as the covariance on this estimate.

The first two steps can be done offline in a discrete calculation since they have no dependence on the time for which the prediction is being made. To accomplish the first step and determine the parameters of the Gaussian, there a number of approaches or models that can be used. A first model is based on frequency counts while a second and a third method use an autoregressive model of the multivariate time series $\{f_i\}$. The second and third models differ in the underlying simplifications made, with the second model being more accurate but more complex.

If there is sufficient historical inventory data, the simplest possible way to determine the parameters of the Gaussian is through unbiased frequency count estimates. From the historical record it is relatively easily to build up the following estimates:

$$\hat{\mu}=\frac{\Sigma_n f_n^{\%}}{\Sigma_n 1} \text{ and } \hat{\Sigma}=\frac{\Sigma_n(f_n^{\%}-\hat{\mu})(f_n^{\%}-\hat{\mu})^T}{-1+\Sigma_n 1} \quad (0.8)$$

As additional inventory data is generated, these estimates are easily updated online. As such, the model is adaptive to and learns from changes in conditions.

Because subsequent plans are likely to be related to each other (e.g., the latter plan is probably a modification of the former plan) it is a reasonable assumption to model the time series $\{f_i\}$ as an autoregressive process of order p:

$$f_n = w_p + \epsilon_n + \sum_{j=1}^{p} A_j^p f_{n-j} \quad (0.9)$$

where the errors, $\epsilon_n$, are modeled as i.i.d. zero-mean Gaussian variables described by $N(0,C_p)$. There are many software packages which will efficiently estimate the parameters by maximizing the Gaussian likelihood (e.g., least squares) so the model uses the assumption that $w_p$, $C_p$, and all $A_j^p$ are all available. Some packages will attempt to determine the best value of p using a Bayesian information criterion. However, a natural choice in the present setting is $p=\tau$. The proposed predictive algorithm makes use of a number of p.

This probability can be determined as follows:

$$P(f_n,f_{n-1},L,f_{n-p})=P(f_n|f_{n-1},L,f_{n-p})P(f_{n-1},L,f_{n-p}) \text{ where }$$

$$P(f_n | f_{n-1}, L, f_{n-p}) =$$

$$\frac{1}{\sqrt{(2\pi)^\tau \det C}}\exp\left[-\frac{1}{2}\left(f_n - w_p - \sum_{j=1}^{p} A_j^p f_{n-j}\right)^T C_p^{-1}\left(f_n - w_p - \sum_{j=1}^{p} A_j^p f_{n-j}\right)\right]$$

The model uses a simplification in order to tractably model $P(f_{n-1},L,f_{n-p})$, which can be written as $$P(f_{n-1}, L, f_{n-p}) = \prod_{j=1}^{p} P(f_{n-j}).$$

The remaining probability P(f) is assumed to be Gaussian, therefore, $P(f)=\exp[-(f-\mu)^T\Sigma(f-\mu)/2]/\sqrt{(2\pi)^\tau\det\Sigma}$ where $\mu$ and $\Sigma$ can be estimated by simple frequency counts from the historical data:

$$\mu=\frac{\Sigma_n f_n}{\Sigma_n 1} \text{ and } \Sigma=\frac{\Sigma_n(f_n-\mu)(f_n-\mu)^T}{-1+\Sigma_n 1} \quad (0.10)$$

The joint probability is then $$P(f_n, f_{n-1}, L, f_{n-p}) =$$

$$\frac{1}{\sqrt{(2\pi)^{(p+1)q}\det\Sigma^{\%}}}\exp\left[-\frac{1}{2}(f^{\%}-\mu^{\%})^T\Sigma^{\%-1}(f^{\%}-\mu^{\%})\right]$$

where $f^{\%}=[f_n\ f_{n-1}\ L\ f_{n-p}]^T$ and the parameters of the Gaussian are $$\mu^{\%} = \Sigma^{\%} \begin{bmatrix} C_p^{-1} w_p \\ \Sigma^{-1}\mu + (A_1^p)^T C_p^{-1} w_p \\ M \\ \Sigma^{-1}\mu + (A_p^p)^T C_p^{-1} w_p \end{bmatrix}$$

and $$\Sigma^{\%-1} = \begin{bmatrix} C_p^{-1} & -C_p^{-1}A_1^p & L & -C_p^{-1}A_p^p \\ -(A_1^p)^T C_p^{-1} & \Sigma^{-1} + (A_1^p)^T C_p^{-1} A_1^p & L & (A_1^p)^T C_p^{-1} A_p^p \\ M & M & O & M \\ -(A_p^p)^T C_p^{-1} & -(A_p^p)^T C_p^{-1} A_1^p & L & \Sigma^{-1} + (A_p^p)^T C_p^{-1} A_p^p \end{bmatrix}$$

$\Sigma^{-1}$ can be inverted using the identity that if $$A = \begin{bmatrix} V_1 V_1^T & V_1 V_2^T & L & V_1 V_p^T \\ V_2 V_1^T & B + V_2 V_2^T & L & V_2 V_p^T \\ M & M & O & M \\ V_p V_1^T & V_p V_2^T & L & B + V_p V_p^T \end{bmatrix} \text{ then}$$

$$A^{-1} = \begin{bmatrix} (V_1^T)^{-1}(I + V_2^T B^{-1} V_2 + L + V_p^T B^{-1} V_p) V_1^{-1} & -(V_1^T)^{-1} V_2^T B^{-1} & L & -(V_1^T)^{-1} V_p^T B^{-1} \\ B^{-1} V_2 V_1^{-1} & B^{-1} & L & 0 \\ M & M & O & M \\ B^{-1} V_p V_1^{-1} & 0 & L & B^{-1} \end{bmatrix}$$

In the present case take $B=\Sigma^{-1}$, $V_1=-C_p^{-1/2}$, and $V^i=A_i^T C_p^{-1/2}$ for $i\in[2,L,p]$ where $C_p^{-1/2}$ is the Cholesky decomposition of $C^{-1}$ to find $$\Sigma^{\%} = \begin{bmatrix} C_p + A_1^p \Sigma (A_1^p)^T + L + A_p^p \Sigma (A_p^p)^T & A_1^p \Sigma & L & A_p^p \Sigma \\ \Sigma (A_1^p)^T & \Sigma & L & 0 \\ M & M & O & M \\ \Sigma (A_p^p)^T & 0 & L & \Sigma \end{bmatrix}$$

and, by multiplying, the mean is found to be:

$$\mu^{\%} = \begin{bmatrix} w_p + (A_1^p + L + A_p^p)\mu + (A_1^p \Sigma (A_1^p)^T + L + A_p^p \Sigma (A_p^p)^T) C_p^{-1} w_p \\ \mu \\ M \\ \mu \end{bmatrix}.$$

As noted above, $P(f_{n-1},L,f_{n-p})$ was simplified to the form $$\prod_{j=1}^{p} P(f_{n-j}).$$

This can be improved by writing $$P(f_{n-1},L,f_{n-p}) = \underbrace{P(f_{n-1}|f_{n-2},L,f_{n-p})}_{AR(p-1)}\ \underbrace{P(f_{n-2}|f_{n-3},L,f_{n-p})}_{AR(p-2)} L\ \underbrace{P(f_{n-p+1}|f_{n-p})}_{AR(1)} P(f_{n-p}).$$

As noted in the above equations, each conditional probability can be modeled as an autoregressive process of successively smaller orders. The parameters of each process can be determined from the historical times series. For the final unconditional probability the model uses the same Gaussian assumption as before. Each conditional probability for the AR(p–i) process is written as $$P(f_{n-i} \mid f_{n-i-1}, L, f_{n-p}) = \frac{\exp\left[-\frac{1}{2}\left(f_{n-i} - w_{p-i} - \sum_{j=1}^{p-i} A_j^{p-i} f_{n-j-i}\right)^T C_{p-i}^{-1} \left(f_{n-i} - w_{p-i} - \sum_{j=1}^{p-i} A_j^{p-i} f_{n-j-i}\right)\right]}{\sqrt{(2\pi)^q \det C_{p-i}}}$$

and the unconditional probability for $f_{n-p}$ is the same as before having mean $\mu$ and covariance $\Sigma$. Combining all these results shows that the joint density $P(f_n, L, f_{n-p})$ is Gaussian with precision (inverse covariance) given by $\Sigma^{\%^{-1}}$ (whose rows and columns have been ordered according to $f^\%$, which can be formed as $\Sigma^{\%^{-1}} = V_p V_p^T + L + V_1 V_1^T + V_0 V_0^T$ where $C_0 \equiv \Sigma$ and the $(i+1)q \times q$ matrices $V_i$ are given by $$V_p = \begin{bmatrix} -C_p^{1/2} \\ (A^p)^T C_p^{1/2} \end{bmatrix}, V_{p-1} = \begin{bmatrix} 0 \\ -C_{p-1}^{1/2} \\ (A^{p-1})^T C_{p-1}^{1/2} \end{bmatrix}, L, V_0 = \begin{bmatrix} 0 \\ M \\ 0 \\ -C_0^{1/2} \end{bmatrix}$$

and $A^p$ is the $q \times pq$ matrix given by $A^p = [A_1^p \; A_2^p \; L \; A_p^p]$. Given this particular form for the precision matrix, its Cholesky decomposition can immediately be written down as $$\begin{bmatrix} \sum_{k=0}^{p}(Q_k^p)^T C_{p-k} Q_k^p & \sum_{k=0}^{p-1}(Q_{k+1}^p)^T C_{p-1-k} Q_k^{p-1} & \sum_{k=0}^{p-2}(Q_{k+2}^p)^T C_{p-2-k} Q_k^{p-2} & L & (Q_p^p)^T C_0 Q_0^0 \\ \sum_{k=0}^{p-1}(Q_k^{p-1})^T C_{p-1-k} Q_{k+1}^p & \sum_{k=0}^{p-1}(Q_k^{p-1})^T C_{p-1-k} Q_k^{p-1} & \sum_{k=0}^{p-2}(Q_k^{p-1})^T C_{p-2-k} Q_k^{p-2} & L & (Q_{p-1}^{p-1})^T C_0 Q_0^0 \\ \sum_{k=0}^{p-2}(Q_k^{p-2})^T C_{p-2-k} Q_{k+2}^p & \sum_{k=0}^{p-2}(Q_k^{p-2})^T C_{p-2-k} Q_{k+1}^{p-1} & \sum_{k=0}^{p-2}(Q_k^{p-2})^T C_{p-2-k} Q_{k+1}^{p-2} & L & (Q_{p-2}^{p-2})^T C_0 Q_0^0 \\ M & M & M & O & M \\ (Q_0^0)^T C_0 Q_p^p & (Q_0^0)^T C_0 Q_{p-1}^{p-1} & (Q_0^0)^T C_0 Q_{p-2}^{p-2} & L & (Q_0^0)^T C_0 Q_0^0 \end{bmatrix}$$

$$\begin{bmatrix} -C_p^{1/2} & 0 & L & 0 \\ (A_1^p)^T C_p^{1/2} & -C_{p-1}^{1/2} & L & 0 \\ M & M & O & M \\ (A_p^p)^T C_p^{1/2} & (A_{p-1}^{p-1})^T C_p^{1/2} & L & -C_0^{1/2} \end{bmatrix}.$$

In this form the inverse is easier to calculate. If an inverse of the form below is necessary:

$$\begin{bmatrix} -(C_p^{1/2}) & 0 & L & 0 \\ (C_{p-1}^{1/2})^T Q_1^p & -(C_{p-1}^{1/2}) & L & 0 \\ M & M & O & M \\ (C_0^{1/2})^T Q_p^p & (C_0^{1/2})^T Q_{p-1}^{p-1} & L & (C_0^{1/2})^T \end{bmatrix}$$

then the Q matrices must satisfy:

$$I\delta_{t,j} = \sum_{\alpha=j}^{\min(p-j,t)} (A_{i-\alpha}^{p-\alpha})^T Q_{\alpha-j}^{p-j} \text{ for } 0 \leq i + j \leq p$$

where $A_0^i = Q_0^i \equiv -I$. The iterative solution satisfying the requirement is given by starting from $Q_0^0 \equiv -I$.

Thus the covariance matrix, $\Sigma^\%$, is equal to

This matrix can be easily implemented in software as executable instructions to provide the covariance.

Having determined the covariance matrix, the mean is determined by completing the square:

$$\mu^\% = \Sigma^\% \begin{bmatrix} C_p^{-1} & 0 & 0 & L & 0 \\ C_p^{-1} A_1^p & C_{p-1}^{-1} & 0 & L & 0 \\ C_p^{-1} A_2^p & C_{p-1}^{-1} A_1^{p-1} & C_{p-2}^{-1} & L & 0 \\ M & M & M & O & M \\ C_p^{-1} A_p^p & C_{p-1}^{-1} A_{p-1}^{p-1} & C_{p-2}^{-1} A_{p-2}^{p-2} & L & C_0^{-1} \end{bmatrix} \begin{bmatrix} w_p \\ w_{p-1} \\ w_{p-2} \\ M \\ w_0 \end{bmatrix}$$

with $\Sigma^{\%}$ as above. Again this matrix and its square are easily implemented in software as executable instructions.

Although complex on paper, the algorithm is computationally very efficient. During the training phase the covariance matrix and its mean can be estimated with a single pass through the data by recording frequency counts. If there are D data points then the complexity of accomplishing both tasks is of the order $O(D(p+1)q((p+1)q+1))$. Prediction is not much more complicated. The dominant factor is the computation of $\Sigma_2^{-1}$, which is of order $O(|N_2|^3)$. Moreover, this matrix inverse can be stored and need not be recalculated with each prediction.

To be used as an online algorithm, the above algorithm must be modified so that it can operate in an online mode in which all parameters of the algorithm (i.e., the mean and covariance) are continually updated as new data arrives so that it is adaptive. This is straightforward because updates to the mean and covariance are simple to implement in software. The algorithm also can be modified to discount data from the past by a factor $0 \leq \lambda \leq 1$. This allows the algorithm to learn from recent events and adapt to changing conditions. Thus, if the data $f_1, L, f_{T-2}, f_{T-1}, f_T$ is available at time T, the estimate of the mean is $$\hat{\mu}_T = \frac{f_T + \lambda f_{T-1} + \lambda^2 f_{T-2} + L + \lambda^{T-1} f_1}{D_T(\lambda)} \quad (0.11)$$

and the estimate of the covariance at time T as $$\hat{\Sigma}_T = \frac{(f_T - \hat{\mu})(f_T - \hat{\mu})^T + \lambda(f_{T-1} - \hat{\mu})(f_{T-1} - \hat{\mu})^T + L + \lambda^{T-1}(f_1 - \hat{\mu})(f_1 - \hat{\mu})^T}{-1 + D_T(\lambda)} \quad (0.12)$$

where the denominator is given by $D_T(\lambda) = 1 + \lambda + L + \lambda^{T-1} = (1 - \lambda^T)/(1 - \lambda)$. With these definitions the algorithm can be implemented in software to provide running estimates of the mean and covariance and update them as $$\hat{\mu}_T = \frac{f_T}{D_T(\lambda)} + \lambda \frac{D_{T-1}(\lambda)}{D_T(\lambda)} \hat{\mu}_{T-1} \quad (0.13)$$

and $$\hat{\Sigma}_T = \frac{(f_T - \hat{\mu})(f_T - \hat{\mu})^T}{-1 + D_T(\lambda)} + \lambda \frac{-1 + D_{T-1}(\lambda)}{-1 + D_T(\lambda)} \hat{\Sigma}_{T-1} \quad (0.14)$$

The discount factor $\lambda$ should be set to match the time scale for variation of the problem. If behavior is stationary then $\lambda = 1$ otherwise $\lambda$ should be set from the data. One quick and basic manner to accomplish this is to match some characteristic time of variation, $\bar{T}$ to the average discount time $1/(1-\lambda)$, i.e., $\lambda = (\bar{T}-1)/\bar{T}$. Another way to set $\lambda$ is by minimizing the cross-validation error.

Figure 7:
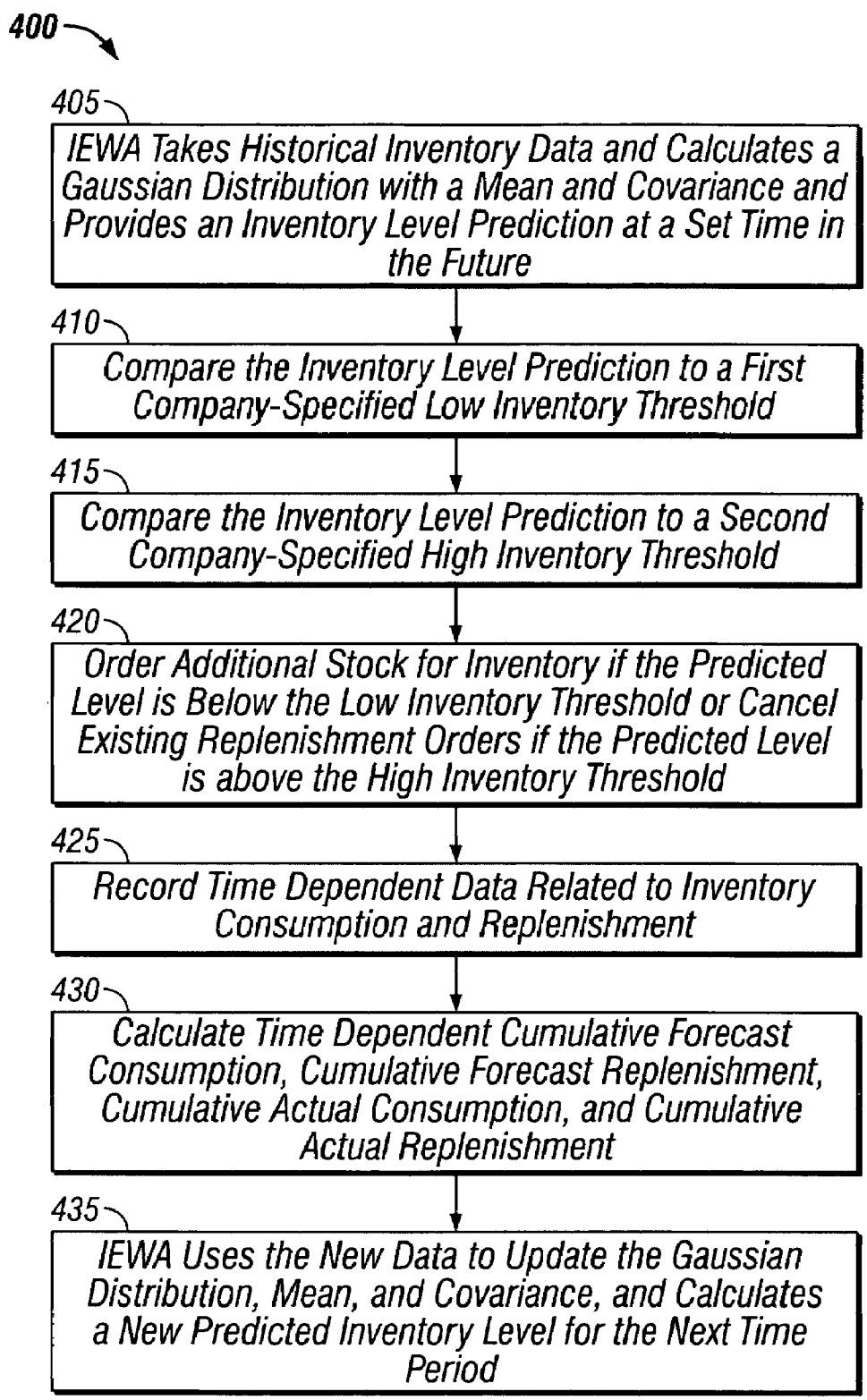
FIG. 7 is a flow chart illustrating the operation of an IEWA to predict an inventory level.

Referring to FIG. 7, in one implementation 400 in a supply chain management system, the IEWA uses a probabilistic predictive algorithm embodied in executable instructions on one or more computer systems to estimate future inventory levels as follows: First, the IEWA takes any historical inventory data to calculate a Gaussian distribution with a mean and covariance and provide an inventory prediction at a set time in the future (step 405). The software can be further programmed to compare the prediction to a first company-specified low inventor threshold and to a second company-specified high inventory threshold (step 410). The IEWA can be programmed to order additional stock for inventory if the predicted level is below the low inventory threshold (step 415) or cancel existing replenishment orders if the threshold is above the high inventory threshold (step 420). The IEWA then records time dependent data related to inventory consumption and replenishment (step 425) so that it can calculate time dependent cumulative forecast consumption, cumulative forecast replenishment, cumulative actual consumption, and cumulative actual replenishment (step 430). This data can vary over time, seasonally, and for unknown reasons, such as recessions or other changes in economic conditions. The IEWA uses this new data with the historical data to update the Gaussian distribution, mean, and covariance and calculate a new predicted inventory level for the next time period (step 435). Over time, the data accumulated has the likelihood of improving the predicted inventory level within the supply chain management system as the amount of data increases in volume.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method comprising:
    applying machine learning techniques to historical supply chain data to build a conditional probabilistic model including patterns of behavior related to consumption and replenishment activities in a supply chain;
    receiving inventory data relating to stock in an inventory;
    applying the inventory data to a conditional probabilistic predictive statistical algorithm, wherein the conditional probabilistic predictive statistical algorithm uses the conditional probabilistic model to process the inventory data and to calculate a predicted inventory level based on a supply prediction and a demand prediction, the supply prediction factoring in variability in supply chain activities;
    using the calculated predicted inventory level to determine whether to order additional stock for the inventory; and
    automatically ordering a replenishment of the inventory when the calculated predicted inventory level falls below a predetermined minimum.

2. The method of claim 1, wherein the inventory data is generated using a radio-frequency identification device.

3. The method of claim 1, wherein the inventory data is generated upon the sale of the stock in the inventory.

4. The method of claim 1, wherein the inventory data is generated upon the transfer of the stock in the inventory.

5. The method of claim 1, wherein the conditional probabilistic model uses a conditional Gaussian approximation.

6. The method of claim 1, wherein the conditional probabilistic model uses historical inventory data and current inventory data.

7. The method of claim 1, wherein the conditional probabilistic model further calculates an upside 10% confidence bound and a downside 10% confidence bound.

8. The method of claim 7, further comprising:
    using the calculated upside 10% confidence bound and the downside 10% confidence bound in determining whether to order additional stock for the inventory.

9. The method of claim 1, wherein the inventory data includes actual cumulative replenishment, forecast cumulative replenishment, actual cumulative consumption, and forecast cumulative consumption data.

10. The method of claim 1, further comprising: recording data related to inventory consumption and replenishment.

11. The method of claim 10, further comprising: using the recorded data to calculate cumulative forecast consumption, cumulative forecast replenishment, cumulative actual consumption, and cumulative actual replenishment.

12. The method of claim 11, further comprising instructions operable to use the inventory data with the calculated cumulative forecast consumption, cumulative forecast replenishment, cumulative actual consumption, and cumulative actual replenishment to calculate a second predicted inventory level.

13. The method of claim 1, wherein the inventory agent is implemented in a supply chain management system.

14. A system comprising one or more computer systems and an inventory agent computer coupled to the computer systems over a network, the inventory agent computer being operable to:
apply machine learning techniques to historical supply chain data to build a conditional probabilistic model including patterns of behavior related to consumption and replenishment activities in a supply chain;
receive inventory data relating to stock in an inventory;
apply the inventory data to a conditional probabilistic predictive statistical algorithm, wherein the conditional probabilistic predictive statistical algorithm uses the conditional probabilistic model to process the inventory data and to calculate a predicted inventory level, an upside 10% confidence bound of the predicted inventory level and a downside 10% confidence bound of the predicted inventory level, based on a supply prediction and a demand prediction, the supply prediction factoring in variability in supply chain activities; and
use the calculated predicted inventory level to determine whether to order additional stock for the inventory.

15. The system of claim 14, further comprising instructions to generate the inventory data upon receipt from a radio-frequency identification device.

16. The system of claim 14, further comprising instructions to generate the inventory data upon the sale of the stock in the inventory.

17. The system of claim 14, further comprising instructions to generate the inventory data upon the transfer of the stock in the inventory.

18. The system of claim 14, wherein the conditional probabilistic model uses a conditional Gaussian approximation.

19. The system of claim 14, further comprising instructions to use historical inventory data and current inventory data in the conditional probabilistic model.

20. The system of claim 14, further comprising instructions to use the calculated upside 10% confidence bound and the downside 10% confidence bound in determining whether to order additional stock for the inventory.

21. The system of claim 14, wherein the inventory data includes actual cumulative replenishment, forecast cumulative replenishment, actual cumulative consumption, and forecast cumulative consumption data.

22. The system of claim 14, further comprising instruction operable to cause the inventory agent computer to order a replenishment of the inventory.

23. The system of claim 14, further comprising instructions operable to record data related to inventory consumption and replenishment.

24. The system of claim 23, further comprising instructions operable to use the recorded data to calculate cumulative forecast consumption, cumulative forecast replenishment, cumulative actual consumption, and cumulative actual replenishment.

25. The system of claim 24, further comprising instructions operable to use the inventory data with the calculated cumulative forecast consumption, cumulative forecast replenishment, cumulative actual consumption, and cumulative actual replenishment to calculate a second predicted inventory level.

26. The system of claim 14, wherein the inventory agent computer is implemented in a supply chain management system.

27. A machine readable medium having instructions therein which when executed by a computer cause the computer to perform a set of operations comprising:
applying machine learning techniques to historical supply chain data to build a conditional probabilistic model including patterns of behavior related to consumption and replenishment activities in a supply chain;
receiving inventory data relating to stock in an inventory;
applying the inventory data to a conditional probabilistic predictive statistical algorithm, wherein the conditional probabilistic predictive statistical algorithm uses the conditional probabilistic model to process the inventory data and to calculate a predicted inventory level based on a supply prediction and a demand prediction, the supply prediction factoring in variability in supply chain activities;
using the calculated predicted inventory level to determine whether to order additional stock for the inventory; and
automatically ordering a replenishment of the inventory when the calculated predicted inventory level indicates a likely undesirable variation in inventory.

28. The machine readable medium of claim 27, wherein the inventory data is generated using a radio-frequency identification device.

29. The machine readable medium of claim 27, wherein the inventory data is generated upon the sale of the stock in the inventory.

30. The machine readable medium of claim 27, wherein the inventory data is generated upon the transfer of the stock in the inventory.

31. The machine readable medium of claim 27, wherein the conditional probabilistic model uses a conditional Gaussian approximation.

32. The machine readable medium of claim 27, wherein the conditional probabilistic model uses historical inventory data and current inventory data.

33. The machine readable medium of claim 27, wherein the conditional probabilistic model further calculates an upside 10% confidence bound and a downside 10% confidence bound.

34. The machine readable medium of claim 33, further comprising instructions to use the calculated upside 10% confidence bound and the downside 10% confidence bound in determining whether to order additional stock for the inventory.

35. The machine readable medium of claim 27, wherein the inventory data includes actual cumulative replenishment, forecast cumulative replenishment, actual cumulative consumption, and forecast cumulative consumption data.

36. The machine readable medium of claim 27, further comprising instructions operable to record data related to inventory consumption and replenishment.

37. The machine readable medium of claim 36, further comprising instructions operable to use the recorded data to calculate cumulative forecast consumption, cumulative forecast replenishment, cumulative actual consumption, and cumulative actual replenishment.

38. The machine readable medium of claim 37, further comprising instructions operable to use the inventory data with the calculated cumulative forecast consumption, cumulative forecast replenishment, cumulative actual consumption, and cumulative actual replenishment to calculate a second predicted inventory level.

39. The machine readable medium of claim 27, wherein the inventory agent is implemented in a supply chain management system.

* * * * *